United States Patent [19]

Venkatasubramanian et al.

[11] 4,299,677

[45] Nov. 10, 1981

[54] PROCESS FOR THE PREFERENTIAL SEPARATION OF FRUCTOSE FROM GLUCOSE

[75] Inventors: Kalyanasundram Venkatasubramanian, New Brunswick, N.J.; Surendar M. Jain, Watertown; Anthony J. Giuffrida, North Andover, both of Mass.

[73] Assignees: The Hubinger Co., Keokuk, Iowa; Ionics, Inc., Watertown, Mass. ; a part interest to each

[21] Appl. No.: 203,633

[22] Filed: Nov. 3, 1980

[51] Int. Cl.$^3$ .............................................. B01D 13/02
[52] U.S. Cl. ................................ 204/180 P; 204/301; 127/42; 127/46.3
[58] Field of Search ........................ 204/180 P, 301; 127/46 B, 53, 42, 63, 46 A

[56] References Cited

U.S. PATENT DOCUMENTS

| | | | |
|---|---|---|---|
| 3,290,173 | 12/1966 | Marino | 127/63 |
| 3,383,245 | 5/1968 | Scallet et al. | 127/53 |
| 3,475,216 | 10/1969 | Walon | 204/180 P X |
| 3,525,682 | 8/1970 | McRae et al. | 204/301 |
| 3,666,647 | 5/1972 | Kubo et al. | 204/180 P |
| 3,781,174 | 12/1973 | Nishijima et al. | 127/46 A |

Primary Examiner—Arthur C. Prescott
Attorney, Agent, or Firm—Paul & Paul

[57] ABSTRACT

This invention describes the process of separating fructose preferentially from a mixture of glucose and fructose by using ion exchange membranes. More particularly it relates to the process comprising the steps of (1) passing a liquid mixture of fructose and glucose through a first feed chamber of an electro-osmosis cell comprising at least two chambers defined between ion exchange membranes having alternating high and low permeability coefficients with respect to each other, (2) passing a direct electric current transversely through said membranes and chambers in a direction to cause the fructose to pass from said feed chamber through said high permeability coefficient membrane into a second chamber with said fructose being substantially retained in the second chamber, and (3) recovering a glucose enriched and a fructose enriched effluent from the separate chambers.

3 Claims, 1 Drawing Figure

PROCESS FOR THE PREFERENTIAL SEPARATION OF FRUCTOSE FROM GLUCOSE

BRIEF SUMMARY OF THE INVENTION

According to U.S. Pat. No. 3,440,159, the electrical separation of low molecular weight substantially un-ionized substances from liquid mixtures thereof with other substances is known. That patent relates to such separation of un-ionized or only partially ionized substances of low molecular weight (crystalloids) from high molecular weight substances (colloids) in aqueous solution by causing the former to migrate under the influence of an electric potentional across ion selective membranes which are substantially impermeable to the high molecular weight substances (colloids). As examples of this process it is disclosed that such low molecular weight un-ionized substances as phenol, furfurol, xylose, arabinose, sucrose, lactose, fructose, mannose, maltose, and dextrose may be separated from such high molecular weight substances as albumin, casein, polysaccharides, lignin and dextrin, for example. Moreover, U.S. Pat. No. 3,718,560 discloses the removal of salts from sugar solutions by electrodialysis in a cell having ion permeable membranes alternately disposed between the electrodes. This same patent discloses that ionizing salts have also been removed from sugar solutions by means of cation and anion exchange resins. Furthermore, U.S. Pat. No. 3,806,363 discloses the following methods of separating glucose and fructose from mixtures containing such sugars: (1) converting fructose into a calcium-fructose complex by treatment with calcium hydroxide; (2) use of a calcium form cation-exchange resin bed; (3) use of a strontium form cation-exchange resin bed; (4) use of a silver form cation-exchange resin bed; (5) use of a borate form anion-exchange resin bed; (6) use of a hydrazine form cation-exchange resin bed, and (7) a method involving the use of a bisulfite form anion-exchange resin bed. According to U.S. Pat. No. 3,806,363, only the method utilizing calcium hydroxide has been adopted for commercial operation, but in poor yield. Furthermore, the cation exchange resin processes are not very flexible and result in highly dilute process streams since water is used as the desorbent. This results in high evaporation cost.

It has now been found that fructose may be preferentially separated from a mixture of glucose and fructose. This result is accomplished by a process comprising the steps of (1) passing a liquid mixture of fructose and glucose through a first feed chamber of an electro-osmosis cell comprising at least two chambers defined between ion exchange membranes having alternating high and low permeability coefficients with respect to each other, (2) passing a direct electric current transversely through said membranes and chambers in a direction to cause the fructose to pass from said feed chambers through said high permeability coefficient membrane into a second chamber with said fructose being substantially retained in the second chamber, and (3) recovering a glucose enriched and a fructose enriched effluent from the separate chambers. Preferably, the ion-exchange membranes are in the form of a cation of an alkaline earth metal selected from the class consisting of calcium, magnesium and barium.

DETAILED DESCRIPTION OF THE INVENTION

Figure 1:
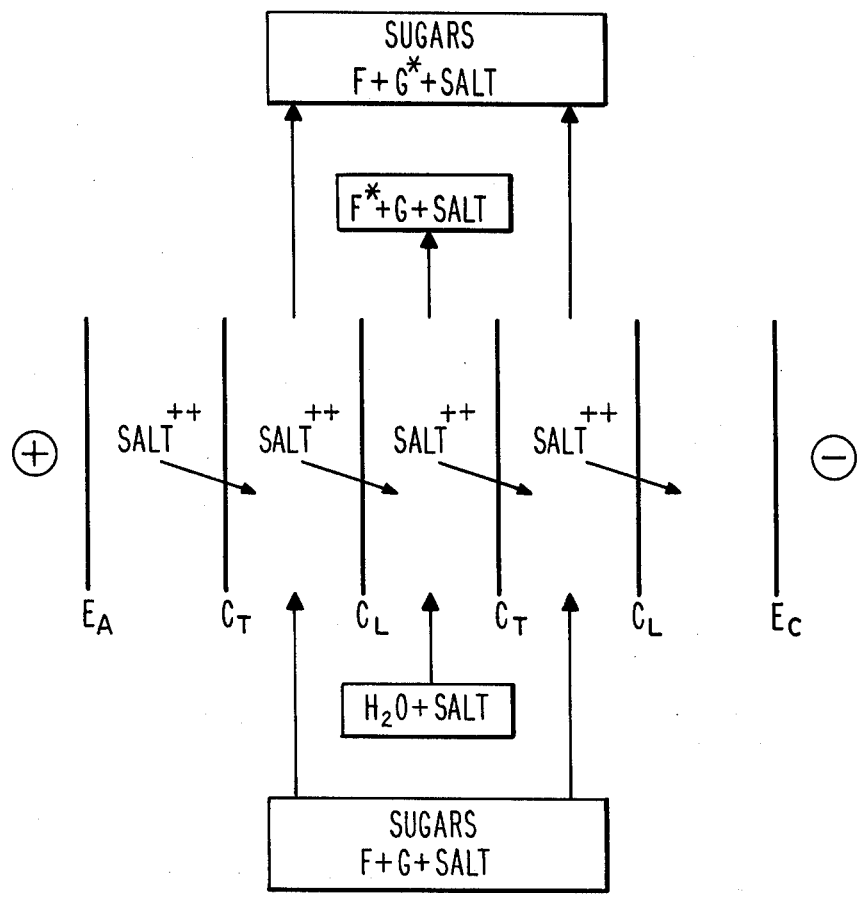

The process of this invention may be described by reference to FIG. 1 wherein:

$E_a$ = anode electrode
$C_L$ = relatively high permeability membrane
$C_T$ = relatively low permeability membrane
F = fructose
G = glucose
* = indication of enriched product
$E_c$ = cathode electrode FIG. 1 shows schematically a stack of electrodialysis membranes in a configuration designed for electroosmatic transfer. A complete discussion of electrodialysis membranes is contained in the publication entitled "Principles and Applications of Electrodialysis and Related Membrane Processes" by William B. Iaconelli, published by Ionics, Inc., Watertown, MA 02172 (july 1970). A charge of electricity is shown being applied to the cathode electrode. The concept of alternating high and low permeability coefficients of cation and anion exchange membranes is described in U.S. Pat. No. 3,440,159. A solution of fructose, glucose and salt is shown being introduced between alternating high permeability and low permeability membranes. Also an aqueous salt solution is shown being introduced between alternating membranes. In accordance with the process of this invention the salt comprises a salt of an alkaline earth metal selected from the group consisting of calcium, magnesium and barium. This operating electrodialysis stack effectively produces the two effluents shown, that is a glucose enriched stream and a fructose enriched stream. The surprising fact about this result is that such separation is made between fructose and glucose which have the same molecular weight.

The records of actual runs of the electrodialysis method in accordance with the process of this invention are summarized in Tables 1 and 2, as follows:

TABLE I

Fructose/Glucose Separation
Basis: Enriched Stream Analysis

| Run # | Description salt | conc. | temp, °C | pH | Run Duration minutes | DILUTE STREAM DESCRIPTION INITIAL gFr | gDx | Vol, l | FINAL gFr | gDx | Vol, l | Sugar transferred gFr | gDx | Flux lb/hr ft² | No. of Faradays | Power Consump. Whrs. | Sugar Transfer g/Faraday Fr | Dx | R = F/G | KWH/ lb Fr |
|---|---|---|---|---|---|---|---|---|---|---|---|---|---|---|---|---|---|---|---|---|
| 2 | MgCl₂ | 10, | 45, | 3-4 | 60 | 0 | 504 | 1.242 | 39 | 480 | 1.287 | 39 | −24 | 0.013 | 1.491 | 149.8 | 26.2 | −16.1 | −1.6 | 1.744 |
| 3 | " | 20, | 43, | 3-4 | 60 | 0 | 517 | 1.189 | 30 | 486 | 1.179 | 30 | −31 | 0.001 | 1.278 | 94.3 | 23.4 | −24.2 | −0.97 | 1.427 |
| 4 | " | 5, | 43, | 3-4 | 60 | 0 | 516 | 1.231 | 33 | 497 | 1.276 | 33 | −19 | 0.012 | 1.137 | 137.0 | 28.9 | −16.7 | −1.73 | 1.885 |
| 5 | " | 10, | 38, | 3-4 | 60 | 0 | 502 | 1.149 | 29 | 491 | 1.204 | 29 | −11 | 0.016 | 1.141 | 114.7 | 25.4 | −9.6 | −2.6 | 1.796 |
| 6 | " | 10, | 44, | 3-4 | 60 | RESULTS NOT AVAILABLE | | | | | | | | | 1.502 | 120.8 | | | | — |
| 17 | " | 10, | 49, | >6 | 60 | 0 | 496 | 1.215 | 42 | 490 | 1.310 | 42 | −6 | 0.032 | 1.434 | 144.1 | 29.3 | −4.2 | −6.98 | 1.558 |
| 18 | " | 10, | 47, | >6 | 60 | 0 | 512 | 1.185 | 40 | 495 | 1.265 | 40 | −17 | 0.020 | 1.385 | 139.2 | 28.9 | −12.3 | −2.35 | 1.580 |
| 7 | CaCl₂ | 20, | 42, | 3-4 | 60 | 0 | 502 | 1.242 | 38 | 496 | 1.312 | 38 | −6 | 0.028 | 1.502 | 120.8 | 25.3 | −4.0 | −6.33 | 1.443 |
| 8 | " | 10, | 42, | 3-4 | 60 | 0 | 512 | 1.166 | 36 | 511 | 1.251 | 36 | −1 | 0.031 | 1.166 | 93.8 | 30.8 | −0.9 | −34.2 | 1.183 |
| 9 | " | 20, | 41, | 3-4 | 60 | 0 | 528 | 1.242 | 25 | 529 | 1.312 | 25 | 1 | 0.023 | 1.218 | 81.6 | 20.5 | 0.8 | 25.6 | 1.482 |
| 10 | " | 20, | 53, | 3-4 | 60 | 0 | 518 | 1.317 | 49 | 514 | 1.397 | 49 | −4 | 0.040 | 1.763 | 118.1 | 28.0 | −2.3 | −12.2 | 1.094 |
| 11 | " | 10, | 47, | >7 | 60 | 0 | 426 | 1.100 | 96 | 402 | 1.150 | 41 | −22 | 0.017 | 1.203 | 96.8 | 34.1 | −18.3 | −1.86 | 1.072 |
| 12 | " | 10, | 49, | 3-4 | 60 | 0 | 555 | 1.273 | 548 | 19 | 1.303 | −7 | 19 | 0.011 | 1.054 | 84.8 | −6.6 | 18.0 | .37 | — |
| 13 | " | 20, | 49, | 3-4 | 60 | 0 | 511 | 1.148 | 26 | 463 | 1.223 | 26 | −48 | −0.019 | 1.234 | 99.3 | 21.1 | −38.9 | −.54 | 1.321 |
| 14 | " | 5, | 49, | >6 | 60 | 0 | 491 | 1.182 | 44 | 499 | 1.297 | 44 | 8 | 0.046 | 1.194 | 128.0 | 36.9 | 6.7 | 5.5 | 0.784 |
| 15 | " | 10, | 49, | >6 | 60 | 0 | 484 | 1.274 | 67 | 461 | 1.379 | 67 | −23 | 0.039 | 1.438 | 115.7 | 46.6 | −16.0 | −2.91 | 0.973 |
| 16 | " | 10, | 49, | 3-8 | 60 | 17 | 465 | 1.134 | 62 | 455 | 1.214 | 45 | −10 | 0.031 | 1.205 | 96.4 | 37.0 | −8.3 | −4.46 | 0.784 |
| 19 | KCl, | 10, | 50, | 3-8 | 35 | 0 | 500 | 1.340 | 34 | 503 | 1.440 | 34 | 3 | 0.056 | 2.241 | 180.2 | 15.2 | 1.3 | 11.7 | 2.406 |
| 20 | KCl, | 5, | 49, | 3-4 | 40 | 0 | 509 | 1.270 | 29 | 514 | 1.355 | 29 | 5 | 0.045 | 1.828 | 196.0 | 15.8 | 2.7 | 5.85 | 3.068 |
| 21 | BaCl₂, | 10, | 46, | 3-4 | 80 | 0 | 509 | 1.270 | 52 | 518 | 1.415 | 52 | 9 | 0.040 | 1.317 | 132.0 | 39.5 | 6.8 | 5.81 | 1.152 |
| 22 | BaCl₂, | 10, | 45, | >6 | 80 | 0 | 515 | 1.310 | 51 | 516 | 1.445 | 51 | 1 | 0.034 | 1.254 | 126.0 | 40.7 | 0.8 | 50.9 | 1.122 |

TABLE II

Fructose/Glucose Separation
Basis: Dilute Stream Analysis

| Run # | Description salt, | conc, | temp, °C. | pH | Run Duration minutes | DILUTE STREAM DESCRIPTION INITIAL gFr | gDx | Vol,l | FINAL gFr | gDx | Vol,l | Sugar transferred gFr | gDx | Flux lb/hr ft² | No. of Faradays | Power Consump. Whrs. | Sugar Transfer g/Faraday Fr | Dx | R = F/G | KWH/ lb Fr |
|---|---|---|---|---|---|---|---|---|---|---|---|---|---|---|---|---|---|---|---|---|
| 2 | MgCl₂ | 10, | 45, | 3-4 | 60 | 293 | 237 | 1.242 | 236 | 235 | 1.162 | 57 | 2 | 0.052 | 1.491 | 149.8 | 38.2 | 1.3 | 28.5 | 1.193 |
| 3 | " | 20, | 43, | 3-4 | 60 | 283 | 253 | 1.176 | 241 | 254 | 1.121 | 42 | -1 | 0.036 | 1.278 | 94.3 | 32.8 | -0.8 | -40.1 | 1.019 |
| 4 | " | 5, | 43, | 3-4 | 60 | 283 | 251 | 1.213 | 227 | 240 | 1.131 | 56 | 11 | 0.059 | 1.137 | 137.0 | 49.3 | 9.7 | 5.1 | 1.111 |
| 5 | " | 10, | 38, | 3-4 | 60 | 273 | 253 | 1.196 | 226 | 247 | 1.126 | 47 | 6 | 0.047 | 1.141 | 114.7 | 41.2 | 5.3 | 7.8 | 1.108 |
| 6 | " | 10, | 44, | 3-4 | 60 | 208 | 189 | 1.174 | 162 | 174 | 1.079 | 46 | 15 | 0.054 | 1.502 | 120.8 | 30.0 | 10.0 | 3.0 | 1.192 |
| 17 | " | 10, | 49, | >6 | 60 | 277 | 250 | 1.325 | 225 | 245 | 1.220 | 52 | 5 | 0.050 | 1.434 | 144.1 | 36.3 | 3.5 | 10.4 | 1.258 |
| 18 | " | 10, | 47, | >6 | 60 | 286 | 246 | 1.302 | 238 | 250 | 1.212 | 48 | -4 | 0.039 | 1.385 | 139.2 | 34.7 | -2.9 | -12.0 | 1.317 |
| 7 | CaCl₂ | 20, | 42, | 3-4 | 60 | 282 | 244 | 1.235 | 227 | 235 | 1.160 | 55 | 9 | 0.056 | 1.502 | 120.8 | 36.6 | 6.0 | 6.1 | 0.997 |
| 8 | " | 10, | 42, | 3-4 | 60 | 270 | 247 | 1.181 | 217 | 236 | 1.081 | 53 | 11 | 0.056 | 1.166 | 93.8 | 45.5 | 9.4 | 4.8 | 0.803 |
| 9 | " | 20, | 41, | 3-4 | 60 | 295 | 266 | 1.260 | 245 | 251 | 1.160 | 54 | 15 | 0.061 | 1.218 | 81.6 | 44.3 | 12.3 | 3.6 | 0.686 |
| 10 | " | 20, | 53, | 3-4 | 60 | 283 | 262 | 1.317 | 220 | 245 | 1.202 | 63 | 17 | 0.070 | 1.763 | 118.1 | 30.1 | 9.6 | 3.7 | 0.854 |
| 11 | " | 10, | 47, | >7 | 60 | 255 | 256 | 1.138 | 203 | 246 | 1.038 | 52 | 10 | 0.055 | 1.203 | 96.8 | 43.2 | 8.3 | 5.2 | 0.845 |
| *12 | " | 10, | 49, | 3-4 | 60 | 269 | 236 | 1.168 | 274 | 210 | 1.113 | -5 | 26 | 0.019 | 1.054 | 84.8 | -4.7 | 24.7 | -0.2 | — |
| 13 | " | 10, | 47, | 3-4 | 60 | 267 | 281 | 1.199 | 210 | 272 | 1.104 | 57 | 9 | 0.058 | 1.234 | 99.3 | 46.2 | 7.3 | 6.3 | 0.791 |
| 14 | " | 5, | 49, | 3-4 | 60 | 265 | 237 | 1.121 | 204 | 222 | 1.001 | 61 | 15 | 0.067 | 1.194 | 128.0 | 51.1 | 12.6 | 4.1 | 0.953 |
| 15 | " | 10, | 49, | >6 | 60 | 266 | 242 | 1.293 | 210 | 235 | 1.162 | 56 | 7 | 0.056 | 1.438 | 115.7 | 38.9 | 4.9 | 8.0 | 0.938 |
| 16 | " | 10, | 49, | >6 | 60 | 279 | 261 | 1.173 | 223 | 244 | 1.073 | 56 | 17 | 0.064 | 1.205 | 96.4 | 46.5 | 14.1 | 3.3 | 0.782 |
| 19 | " | 10, | 50, | 3-8 | 35 | 284 | 247 | 1.350 | 235 | 234 | 1.250 | 49 | 13 | 0.094 | 2.241 | 180.2 | 21.9 | 6.2 | 3.5 | 1.670 |
| 20 | KCl, | 10, | 49, | 3-4 | 40 | 283 | 240 | 1.195 | 237 | 232 | 1.125 | 46 | 8 | 0.071 | 1.828 | 196.0 | 25.2 | 4.4 | 5.8 | 1.934 |
| 21 | BaCl₂ | 10, | 46, | 3-4 | 80 | 281 | 249 | 1.210 | 205 | 224 | 1.055 | 76 | 25 | 0.067 | 1.317 | 132.0 | 57.7 | 19.0 | 3.0 | 0.789 |
| 22 | BaCl₂ | 10, | 45, | >6 | 80 | 289 | 247 | 1.310 | 222 | 226 | 1.140 | 67 | 21 | 0.058 | 1.254 | 126.0 | 53.4 | 16.7 | 3.2 | 0.854 |

*Fructose in conc. Compt.

In all of the above runs, in the incoming stream a mixture of fructose and glucose was used. A ten-cell membrane pair stack with a diluting and a concentrating stream was employed. The analytical results obtained are based on differential polarimetry for fructose/glucose. The solids content was monitored by a hand sugar refractometer and the specific gravity determined from tables for corn syrups. The fructose used was almost free of moisture, whereas the glucose (cerelos) was found to contain 9% moisture. In each run, flow rates, stream volumes, pressures, voltage and current were monitored. A heat exchanger system was incorporated to maintain temperatures of the dilute and enriched streams.

It is apparent from the results shown in Tables I and II that glucose-fructose separation may be achieved by electrodialysis in accordance with the process of this invention. Magnesium, potassium, barium and calcium alkaline earth metals are practical equivalents in mediating the preferential separation of these sugars. The separation can be achieved at salt concentrations as low as 5 gram/liter without significant loss of separation efficiency. Separation factors of at least 1.3 are indicated. Fructose enrichment can be effected even when the same syrup composition is used in both the dilute and enriched chambers initially.

Having thus described the invention, I claim:

1. The process of separating fructose preferentially from a mixture of glucose and fructose by electrodialysis comprising the steps of (1) passing a liquid mixture of fructose and glucose through a first feed chamber of an electro-osmosis cell comprising at least two chambers defined between ion exchange membranes having alternating high and low permeability coefficients with respect to each other, (2) passing a direct electric current transversely through said membranes and chambers in a direction to cause the fructose to pass from said feed chamber through said high permeability coefficient membrane into a second chamber of said cell with said fructose being substantially retained in the second chamber, and (3) recovering a glucose enriched and a fructose enriched effluent from the separate chambers.

2. The process of claim 1 wherein said liquid mixture contains a mediating cation of an alkaline earth metal.

3. The process of claim 2, wherein said alkaline earth metal is selected from the class consisting of calium, barium and magnesium.

* * * * *